Sept. 17, 1968
D. G. McCRACKEN
3,402,253
SWIVEL JOINTS
Filed Oct. 23, 1965
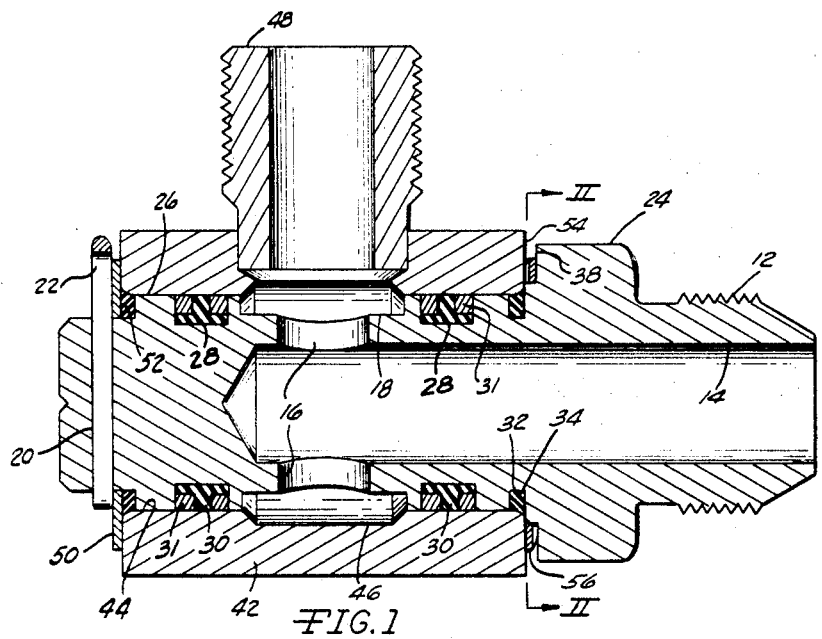
INVENTOR
DONALD G. McCRACKEN
BY Jerry K Harmer
His ATTORNEY

United States Patent Office 3,402,253
Patented Sept. 17, 1968

3,402,253
SWIVEL JOINTS
Donald G. McCracken, McHenry, Ill., assignor to
Aeroquip Corporation, Jackson, Mich.
Filed Oct. 23, 1965, Ser. No. 504,002
1 Claim. (Cl. 174—86)

ABSTRACT OF THE DISCLOSURE

A swivel joint for use in a fluid system that requires electrical conductivity between the relatively rotatable parts. An annular wave spring is compressed between two adjacent relatively movable surfaces to provide the conductivity.

---

The invention pertains to fluid-conducting joints, and particularly relates to a swivel or rotary type joint.

When it is desired to transmit fluids to an oscillating or rotating member, a swivel or rotating joint is usually employed. Basically, such joints consist of a sleeve member upon which a casing member is rotatably or swivelably mounted. Fluid passages are defined in the sleeve and casing members, and appropriate seals are provided to seal the casing and sleeve members relative to each other regardless of the relative angular position of the components. Such seals are usually formed of a resilient material, such as rubber or neoprene, and are often in the form of T-rings. While the sleeve and casing may be formed of an electrical conducting metal, the clearances between the sleeve and casing are often such that electrical continuity between the casing and sleeve does not exist at all times or at all angular positions of the components.

It is a basic object of the invention to provide means for establishing electrical continuity between the sleeve and casing components of a swivel or rotating joint. Such electrical continuity between the sleeve and casing is often desired for purposes of grounding, bleeding off static electrical charges, or other similar purposes.

Another object of the invention is to provide means for establishing and maintaining electrical continuity between the sleeve and casing components of a swivel joint, wherein such conducting means is economically manufactured and is dependable and relatively maintenance-free in its operation.

An additional object of the invention is to provide means for maintaining electrical continuity between the sleeve and casing components of a swivel joint, wherein such means does not hamper the swiveling movement of the joint, and permits either oscillation or full 360° rotation of the components without affecting the electrical characteristics of the continuity producing means.

More particularly, the invention relates to a balanced pressure swivel joint that is properly sealed between the relatively rotatable parts and is further provided at a location removed from one of the seals with a compressed wave spring between two relatively rotatable sufaces thereby providing an electrical connection between the two relatively swivel parts.

These and other objects of the invention arising from the details and relationships of the components of an embodiment thereof will be apparent from the following description and accompanying drawings wherein:

FIG. 1 is a diametrical, elevational, sectional view of an assembled swivel joint incorporating the concept of the invention, FIG. 2 is an elevational, sectional view of the joint of FIG. 1 as taken along section II—II thereof, FIG. 3 is a detail view of the electrical conducting ring and the sleeve and casing shoulders during assembly and prior to final positioning of the casing relative to the sleeve, and FIG. 4 is an elevational view of the electrical conducting spring washer used in the practice of the invention.

FIG. 1 illustrates a balanced pressure swivel joint incorporating the concept of the invention. The swivel joint includes a sleeve 10 exteriorly provided with threads 12 whereby the sleeve may be connected to a fitting or supporting member. The sleeve 10 is also provided with an axially extending bore 14 which is open at the right end, FIG. 1, and adjacent the left end communicates with a pair of radially disposed ports 16. The ports 16 communicate with an annular recess 18 defined on the exterior surface of the sleeve. The left end of the sleeve 10 is provided with a diametrically extending hole 20 adapted to receive a retaining cotter pin 22. The sleeve 10 is provided with wrench-engaging flats 24 which permit the sleeve to be engaged by a wrench for tightening the sleeve into its supporting member.

The sleeve 10 is provided with an exterior cylindrical surface 26 concentrically related to the bore 14. The cylindrical surface 26 is intersected by a pair of annular grooves 28 adapted to receive sealing T-rings 30 and seal retaining elements 31. The annular recess 18 intersects the cylindrical surface 26. The sleeve 10 is also provided with a recess 32 adapted to receive an annular resilient packing ring 34. The recess 32 is partially formed by a surface 36 which radially extends beyond the cylindrical surface 26. The sleeve 10 is also formed with a radially disposed shoulder 38 which is axially spaced from the surface 36 to define a cylindrical shoulder 40.

An annular casing 42 is rotably mounted upon the sleeve 10. The casing 42 is provided with an internal cylindrical surface 44 which is annularly recessed at 46. An adaptor 48 is brased into the casing and includes a passage communicating with the recess 46. The seals 30, 31, and 34 cooperate with the cylindrical surface of the casing and a sealing relationship between the casing and sleeve is achieved. The clearance between the sleeve surface 26 and the casing surface 44 permits free rotation of the casing upon the sleeve.

The casing 42 is axially retained upon the sleeve 10 by means of a retaining washer 50 and the cotter pin 22 received within the diametrical hole 20 and the abutment of the right end of the casing with surface 36. A seal ring 52 is also employed adjacent washer 50.

The right end, FIG. 1, of the casing 42 is provided with a radially extending surface 54 which is in opposed radial relationship to the sleeve shoulder 38.

Because of the necessary clearance between the sleeve surface 26 and the casing surface 44 and because of the substantially uniform, radial biasing action of the O-rings 30, it is very possible for the casing 42 to be electrically insulated from the sleeve 10. Accordingly, the establishment of electrical continuity between the sleeve and the casing at all relative angular positions of these components is not assured. To insure electrical continuity between the sleeve and casing, an annular spring washer 56 is interposed between the shoulder 38 and the surface 54. The configuration of the spring washer 56 is best appreciated from FIGS. 2 and 4. The spring washer 56 is formed of an electrical conducting metal, preferably a thin spring steel, and in the illustrated embodiment, is provided with three "waves" 58 disposed at 120° relative to each other. The "waves" or deflected portions 58 of the spring washer give the spring washer a nonplanar configuration, as will be apparent from FIG. 3. The internal diameter of the spring washer 56 is slightly larger than the diameter of the shoulder 40 and during assembly of the swivel joint, the washer is positioned upon the shoulder 40 as shown in FIG. 3.

FIG. 3 illustrates the normal axial dimension of the spring washer 56 prior to the casing being finally, axially positioned upon the sleeve. As previously mentioned, in the final, axial positioning of the casing upon the sleeve, the casing surface 54 abuts the radial surface 36 defined upon the sleeve. From FIG. 3 it will be appreciated that the spring washer portion 60 significantly extends to the left beyond the sleeve surface 36 even though the diametrically opposite portion of the spring is engaging the sleeve shoulder 38. Upon engagement of the casing surface 54 with the sleeve surface 36 and insertion of the cotter pin 22 into the sleeve hole 20, the spring washer 56 will be deformed or compressed from its normal configuration and an effective frictional engagement between the spring washer 56 and the sleeve shoulder 38 and the casing surface 54 will be produced for the purpose of establishing electrical continuity between the sleeve and casing. The wiping or sliding action between the spring washer and the sleeve and casing provides a self-cleaning action which insures electrical continuity.

The spring washer 56 does not hinder the swiveling action of the casing upon the sleeve and whether the casing is merely oscillating relative to the sleeve 10, or is rotating relative thereto, will not affect the electrical continuity characteristics. It will, also, be appreciated that as the spring washer 56 is continuously biasing the casing 42 to the left, FIG. 1, should wear occur between the casing surface 54 and the sleeve shoulder 36 axial movement of the casing upon the sleeve will be prevented due to the biasing action of the spring washer.

The shoulder 40 insures the proper positioning of the spring washer 56 upon the sleeve during assembly and operation, and the replacement of the spring washer due to wear may be easily accomplished by removing the cotter pin 22 and sliding the casing 42 from the sleeve cylindrical surface 26.

It is appreciated that various modifications to the inventive concept may be apparent to those skilled in the art without departing from the spirit and scope thereof, and it is intended that the invention be defined only by the scope of the following claim.

I claim:
1. A fluid-conducting joint comprising in combination,
   (a) a sleeve having a passage defined therein, said sleeve including an exterior cylindrical surface circumscribed about said passage, and an O-ring receiving groove at one end of said surface,
   (b) a radially extending port defined in said sleeve in communication with said passage and intersecting said cylindrical surface,
   (c) offset annular inner and outer radially extending surfaces on said sleeve at said one end of said cylindrical surface forming an outer wall of said groove, a shoulder and a confronting annular surface, the outer portion of said annular inner surface extending outwardly of said cylindrical surface,
   (d) an annular casing rotatably mounted on said sleeve cylindrical surface,
   (e) a fluid passage defined in said casing in communication with said port,
   (f) one end of said casing defining an annular radially extending surface contacting said outer portion of said inner annular radial surface and extending thereabove and forming with said shoulder and said outer offset radially extending surface, an annular groove having confronting annular surfaces,
   (g) an annular electrical conducting spring washer compressible in the axial direction circumscribing said sleeve and radially disposed intermediate said shoulder and said confronting annular surfaces, said washer being compressed between said shoulder and said confronting annular surfaces and establishing electrical continuity between said sleeve and said casing, and
   (h) seal means interposed between said sleeve and said casing at a location between said fluid passage and said radially extending surface to thereby prevent the flow of the fluid within the joint from reaching said washer.

References Cited

UNITED STATES PATENTS 2,587,170   2/1952   Klinger et al. _____ 285—279
3,147,015   9/1964   Hanback _____ 285—190

CARL W. TOMLIN, *Primary Examiner.*

W. L. SHEDD, *Assistant Examiner.*